United States Patent
Yang

(10) Patent No.: US 7,760,337 B2
(45) Date of Patent: Jul. 20, 2010

(54) OPTOELECTRONIC DISTANCE MEASURING DEVICE

(75) Inventor: Dezhong Yang, Nanjing (CN)

(73) Assignee: Chervon Limited, Wanchai (HK)

( * ) Notice: Subject to any disclaimer, the term of this patent is extended or adjusted under 35 U.S.C. 154(b) by 108 days.

(21) Appl. No.: 12/259,390

(22) Filed: Oct. 28, 2008

(65) Prior Publication Data
US 2009/0135406 A1    May 28, 2009

(30) Foreign Application Priority Data
Nov. 27, 2007   (CN) .................... 2007 2 0041665 U

(51) Int. Cl.
G01C 3/08  (2006.01)
(52) U.S. Cl. ...................... 356/5.15; 356/5.1
(58) Field of Classification Search ................ 356/5.09, 356/5.1, 5.15
See application file for complete search history.

(56) References Cited

U.S. PATENT DOCUMENTS

| | | | |
|---|---|---|---|
| 5,940,170 A * | 8/1999 | Berg et al. | .................... 356/5.1 |
| 6,463,393 B1 | 10/2002 | Giger | |
| 6,633,367 B2 | 10/2003 | Gogolla | |
| 7,209,222 B2 * | 4/2007 | Kameyama et al. | ........ 356/28.5 |
| 7,224,444 B2 * | 5/2007 | Stierle et al. | ................ 356/5.15 |
| 2009/0002679 A1 * | 1/2009 | Ruff et al. | ................... 356/5.09 |

\* cited by examiner

*Primary Examiner*—Isam Alsomiri
(74) *Attorney, Agent, or Firm*—Greenberg Traurig, LLP

(57) ABSTRACT

An optoelectronic distance measuring device includes a frequency modulator generating a high-frequency modulation signal, an emitter emitting a high-frequency modulated measuring beam to an object to be measured, an avalanche photodiode receiving a reflected measuring beam from the object and generating a corresponding high-frequency reflected measuring signal, and a signal generating device generating a high-frequency mixer signal connected with the avalanche photodiode. The high-frequency mixer signal is applied to the avalanche photodiode and mixed with the high-frequency reflected measuring signal to provide a low-frequency measuring signal which contains phase information for calculating a distance to be measured. In this manner, measuring error due to phase drift is eliminated without the need for an extra internal reference optical path and an mechanical switching device so that the structure of the device is simplified significantly and manufacturing costs are reduced.

11 Claims, 1 Drawing Sheet

OPTOELECTRONIC DISTANCE MEASURING DEVICE

FIELD OF THE INVENTION

The present invention relates to an optoelectronic distance measuring device and, more particularly, to an optoelectronic distance measuring device which uses an avalanche photodiode as a measuring receiver.

BACKGROUND OF THE INVENTION

Optoelectronic distance measuring devices, such as phase-principle laser range finders, have been widely used in construction, interior decoration and other fields with the aid of their high accuracy of measurement. The general principles of measurement are as follows: an emitter emits a modulated measuring beam onto an object to be measured, the beam is then reflected or scattered by the object to be measured, and the reflected beam is picked up by a optoelectronic receiver. Thus, thus the distance from the object to be measured is obtained on the basis of the phase position shift of the modulated measuring beam relative to the emitter. Usually, an avalanche photodiode is used as the optoelectronic receiver for receiving the modulated measuring beam reflected by the object.

FIG. 1 shows a circuit diagram of the optoelectronic distance measuring device which measures the distance based on the phase principle. A mixer signal and an initial frequency signal with the same frequency and the same phase are generated by a phase locked loop (PLL) circuit 11'. The initial frequency signal and a low frequency signal generated by a microprocessor 12' are transmitted onto a quadrature modulator 13' and a frequency modulation signal is then produced in the quadrature modulator 13' and output therefrom. The frequency modulation signal is then amplified by a power amplifier 14', and is superposed on the laser emitter 15' for frequency-modulation of the measuring beam. The emitter 15' emits a frequency-modulated measuring beam onto an object 16' to be measured. The avalanche photodiode 17', which is used as a direct mixer simultaneously, receives the frequency-modulated measuring beam reflected by the object 16' to be measured. The mixer signal is mixed with signals generated according to the received frequency-modulated measuring beam reflected by the object to be measured in the avalanche photodiode 16' and leads to output signals, the output signals are amplified by a transresistance amplifier 18' and filtered out by a low-pass filter 19', then a low-frequency measuring signal is produced. The low-frequency measuring signal contains a phase information which is used for calculating a distance to the object to be measured.

Although the avalanche photodiode has the advantage of high amplification and sensitivity, it is necessary to apply a high, temperature-dependent operating voltage to the avalanche photodiode. Usually a variable, temperature-dependent bias voltage is applied to it. As a result, a capacity of the avalanche photodiode varies with the bias voltage which changes in accordance with temperature, and an unexpired phase drift is produced. The phase drift is thus added to the above-mentioned low-frequency measuring signal which contains the phase information used for calculating the distance to be measured, and hence a measuring error is produced.

In the prior art, an internal reference optical path with a predetermined length is provided in the distance measuring device so as to eliminate the phase drift produced by the avalanche photodiode. A mechanical switching device used for switching between an external measuring optical path and the internal reference optical path is arranged in the emitting optical path of the measuring beam. The avalanche photodiode receives the modulated measuring signal passing through the external measuring optical path and the modulated reference signal passing through the internal reference optical path successively and produces a low-frequency measuring signal and a low-frequency calibration signal, respectively. The low-frequency measuring signal and the low-frequency calibration signal both contain the phase drift produced by the avalanche photodiode and the phase drift is then counteracted by subtracting the phase of the calibration signal from the phase of the measuring signal so that the measuring error is eliminated. The measuring signal and the calibration signal reach the avalanche photodiode successively and alternately by the mechanical switching, which can take many times during a measurement process. Repeated mechanical switching during the measurement process does however result in high mechanical load and considerable wear of the moving parts. Furthermore, the mechanical switching device and the internal optical path make the structure of the distance measuring device complicated which leads to high manufacturing costs and a large weight and volume. All of these are disadvantageous for the miniaturization of the distance measuring device.

Two optoelectronic receivers are alternatively used in some range finders for receiving the reflected measuring signal and the reference signal simultaneously. However, the additional expensive optoelectronic receiver also increases the manufacturing costs of the range finder.

SUMMARY

An optoelectronic distance measuring device having a higher accuracy of measurement without using an internal reference optical path is hereinafter disclosed.

To this end, an optoelectronic distance measuring device has a frequency modulator which generates a high-frequency modulation signal, an emitter which emits a measuring beam modulated by the high-frequency modulation signal to an object to be measured, an avalanche photodiode which receives a reflected measuring beam reflected by the object and generates a corresponding high-frequency reflected measuring signal, and a signal generating device which generates a high-frequency mixer signal. The signal generating device is connected with the avalanche photodiode, the high-frequency mixer signal is transmitted to the avalanche photodiode and mixed with the high-frequency reflected measuring signal in the avalanche photodiode to lead to a low-frequency measuring signal which contains phase information used for calculating a distance to be measured, and a signal processing device connected with the avalanche photodiode is used for determining the distance to be measured. The frequency modulator is connected behind the avalanche photodiode and is also connected with the emitter.

The above high-frequency mixer signal is transmitted to the frequency modulator through the avalanche photodiode and is mixed with a low-frequency mixer signal in the frequency modulator to produce the high-frequency modulation signal which is transmitted to the emitter.

The measuring beam emitted by the emitter is modulated by the high-frequency modulation signal which is produced by the high-frequency mixer signal from the avalanche photodiode so that the high-frequency reflected measuring signal produced by the reflected measuring beam which is received by the avalanche photodiode already contains a phase drift information generated due to variety of temperature and voltage applied on the avalanche photodiode. The high-frequency reflected measuring signal with the phase drift information is mixed with the high-frequency mixer signal which contains the same phase drift in the avalanche photodiode, and leads to a low-frequency signal, while the phase drift is counteracted during the frequency mixing process, and the phase of the low-frequency signal does not contain the phase drift, so that the measuring error due to the phase drift of the avalanche photodiode is eliminated. Compared to the prior art, the measuring error due to the phase drift of the avalanche photodiode is eliminated in the optoelectronic distance measuring device without using an extra internal reference optical path and a mechanical switching device, so that the structure and control method of distance measuring device can be simplified, and the manufacturing costs can also be reduced.

DETAILED DESCRIPTION OF THE PREFERRED EMBODIMENTS

Figure 1:
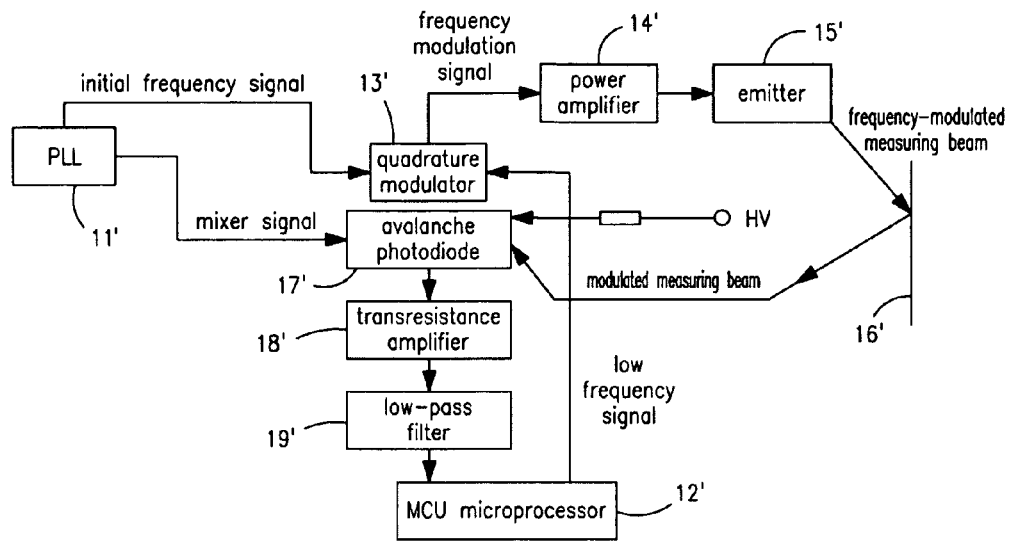
FIG. 1 shows a circuit diagram of an optoelectronic distance measuring device which measures a distance based on phase-principle in the prior art.
Figure 2:
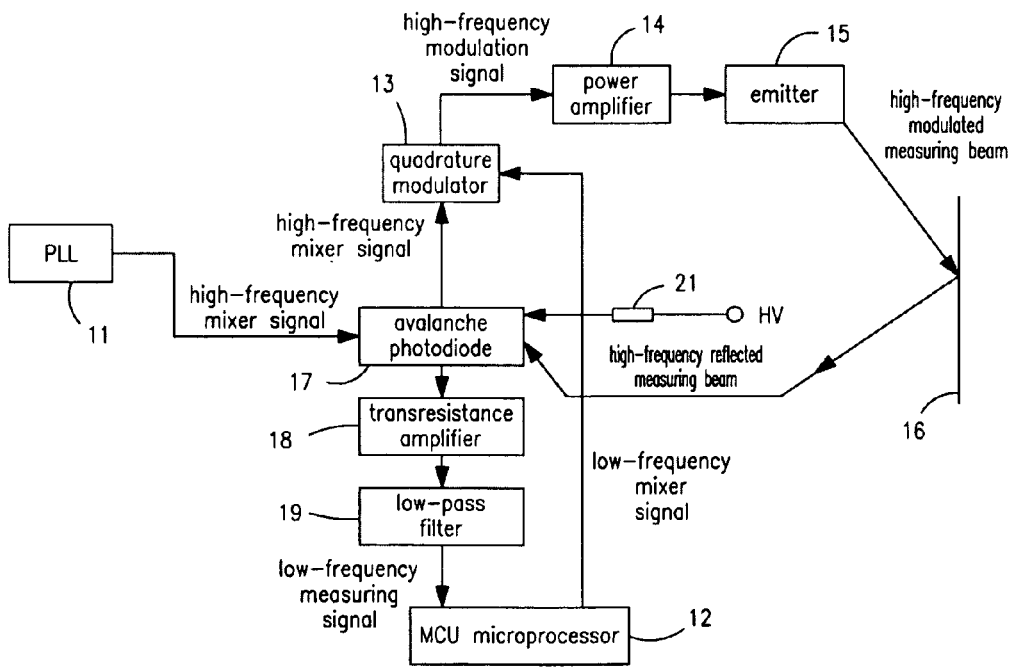
FIG. 2 shows a circuit diagram of an optoelectronic distance measuring device of a preferred embodiment of the present invention.

Referring to FIG. 2, an optoelectronic distance measuring device mainly comprises a phase locked loop (PLL) circuit 11, a quadrature modulator 13 which modulates a high-frequency mixer signal into a high-frequency modulation signal which is used for modulating a measuring beam, an optical signal emitter 15, an avalanche photodiode 17 and a MCU microprocessor 12. The quadrature modulator 13 is connected between the avalanche photodiode 17 and the emitter 15 through electric lines. The avalanche photodiode 17 is used as a measuring signal receiver, and is operated as a direct mixer simultaneously. The avalanche photodiode 17 is connected to a variable bias voltage HV across a series resistor 21.

The phase locked loop circuit (PLL) 11 generates the high-frequency mixer signal which is transmitted to the avalanche photodiode 17 through an electric line, so the high-frequency mixer signal contains a phase drift component due to the variety of temperature and voltage of the avalanche photodiode. The high-frequency mixer signal is transmitted from the avalanche photodiode 17 to the quadrature modulator 13 through electric lines. Meanwhile, a low-frequency mixer signal is outputted from the MCU 12 to the quadrature modulator 13. The high-frequency mixer signal from the avalanche photodiode 17 and the low-frequency mixer signal from the MCU 12 are synthesized in the quadrature modulator 13, and the high-frequency modulation signal for modulating the measuring beam is thus produced. The phase drift component is also contained in the high-frequency modulation signal. The high-frequency modulation signal is outputted to a power amplifier 14. After being amplified, the high-frequency modulation signal is superposed on the emitter 15 and is used for high-frequency modulation of the measuring beam emitted by the emitter 15. The high-frequency modulated measuring beam is transmitted to an object 16 to be measured. The avalanche photodiode 17 receives a reflected measuring beam reflected from the object 16 and produces a corresponding high-frequency reflected measuring signal. The same phase drift component is also contained in the high-frequency reflected measuring signal. The high-frequency reflected measuring signal with the phase drift component is mixed with the high-frequency mixer signal which contains the same phase drift component in the avalanche photodiode 17 which is used as a direct mixer to provide output signals. The output signals are amplified by a transresistance amplifier 18 and then filtered by a low-pass filter 19 to thus produce a low-frequency measuring signal. The low-frequency measuring signal contains the phase information which is used for calculating the distance to the object to be measured. The low-frequency measuring signal is outputted to the MCU 12 and processed therein to calculate a distance between the distance measuring device and the object to be measured. The phase drift component is counteracted during the process of mixing, amplification and filtering, so that the measuring error thereof is eliminated. The MCU 12 can further connect to a display device and control the display device to display measurement results and other information as desired. The emitter 15 mentioned above is a laser diode which is commercially available.

Only the circuit parts of the optoelectronic distance measuring device of the present invention are described above. The optical parts of the optoelectronic distance measuring device which comprise an emitting optical path and an receiving optical path are disclosed in the prior art, so they are omitted herein for the sake of brevity.

The above described preferred embodiments are intended to illuminate the principle of the present invention, but not to limit its scope. It can be easily understood for those skilled in the art that many other modifications and variations of these preferred embodiments will be apparent and may be made without departing from the spirit and the scope of the invention as defined in the following claims.

What is claimed is:

1. An optoelectronic distance measuring device, comprising:
    a frequency modulator which generates a high-frequency modulation signal;
    an emitter which emits a measuring beam to an object to be measured, the measuring beam being modulated by the high-frequency modulation signal;
    an avalanche photodiode which receives a reflected measuring beam reflected from the object and generates a corresponding high-frequency reflected measuring signal;
    a signal generating device which generates a high-frequency mixer signal, wherein the signal generating device is connected with the avalanche photodiode and the high-frequency mixer signal is transmitted to the avalanche photodiode and mixed with the high-frequency reflected measuring signal in the avalanche photodiode to provide a low-frequency measuring signal with the low-frequency measuring signal containing a phase information used for calculating the distance to be measured; and
    a signal processing device connected with said avalanche photodiode and used for determining the distance to be measured;
    wherein the frequency modulator is connected behind the avalanche photodiode and is also connected with said emitter.

2. The optoelectronic distance measuring device as claimed in claim 1, wherein the high-frequency mixer signal is transmitted to the frequency modulator from the avalanche photodiode and is mixed with a low-frequency mixer signal in the frequency modulator to produce the high-frequency modulation signal and wherein the high-frequency modulation signal is applied to the emitter.

3. The optoelectronic distance measuring device as claimed in claim 2, wherein the low-frequency mixer signal is generated by the signal processing device.

4. The optoelectronic distance measuring device as claimed in claim 2, wherein the frequency modulator is a quadrature modulator.

5. The optoelectronic distance measuring device as claimed in claim 4, wherein the signal generating device is a phase locked loop circuit.

6. The optoelectronic distance measuring device as claimed in claim 4, wherein the emitter is a laser diode.

7. The optoelectronic distance measuring device as claimed in claim 4, wherein a power amplifier is connected between the quadrature modulator and the emitter.

8. The optoelectronic distance measuring device as claimed in claim 1, wherein the frequency modulator is a quadrature modulator.

9. The optoelectronic distance measuring device as claimed in claim 8, wherein the signal generating device is a phase locked loop circuit.

10. The optoelectronic distance measuring device as claimed in claim 8, wherein the emitter is a laser diode.

11. The optoelectronic distance measuring device as claimed in claim 8, wherein a power amplifier is connected between the quadrature modulator and the emitter.

* * * * *